(No Model.)
C. H. BARR.
VETERINARY MEDICAL APPARATUS.
No. 399,234. Patented Mar. 12, 1889.
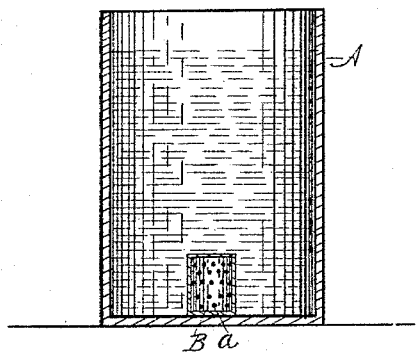
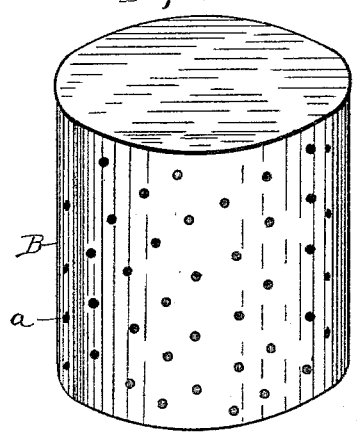
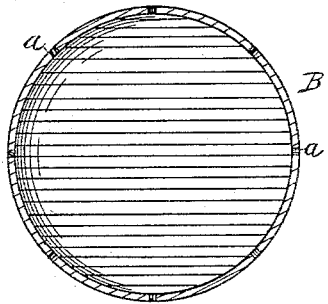
Witnesses.
Thos. H. Hutchins
K. C. Hutchins
Inventor
Cyrus H. Barr.

UNITED STATES PATENT OFFICE.

CYRUS H. BARR, OF DWIGHT, ILLINOIS.

VETERINARY MEDICAL APPARATUS.

SPECIFICATION forming part of Letters Patent No. 399,234, dated March 12, 1889.

Application filed November 17, 1888. Serial No. 291,130. (No model.)

*To all whom it may concern:*

Be it known that I, CYRUS H. BARR, a citizen of the United States of America, residing at Dwight, in the county of Livingston and State of Illinois, have invented certain new and useful Improvements in Apparatus for Medically Treating Diseased Animals, of which the following is a specification, reference being had therein to the accompanying drawings and the letters and figures of reference thereon, forming a part of this specification, in which—

Figure 1 is a central vertical section of my invention as it would appear ready for use. Fig. 2 is an exaggerated perspective view of the perforated closed vessel or can for containing the medical compound; and Fig. 3 is a central horizontal section of Fig. 2, looking down.

This invention relates to a device for treating diseased animals, especially swine for cholera.

Referring to the drawings, B represents a closed vessel—preferably a metal can—having perforations $a$ in its sides. This vessel is designed to contain a medical compound, (not necessary to be stated,) and after being filled is closed up to retain the compound therein. A is a larger vessel, in which the perforated vessel B is placed, as shown in Fig. 1, and intended to rest at its bottom. The vessel A is designed to contain water in sufficient quantity at least to submerge vessel B, and preferably to near its top, as shown.

The medical compound contained in vessel B is intended to be dissolved by the water entering to it through said perforations, and thereby medicate the entire quantity of water in vessel A. The water thus medicated is intended to be given to the diseased animal, and can be replenished as used until all the medical compound in vessel B is exhausted, when another can be supplied and used as before.

Having thus described my invention, what I claim as new, and desire to secure by Letters Patent, is as follows, to wit:

The combination of the closed vessel B, having the perforations $a$, with the vessel A, substantially as and for the purpose set forth.

CYRUS H. BARR.

Witnesses:
L. A. NAFFZIGER,
A. T. DOHERTY.